Figure 1:
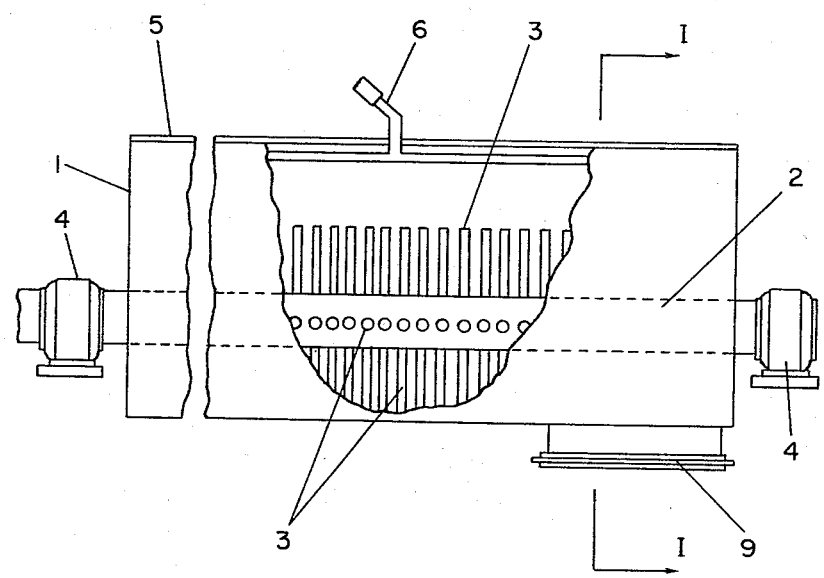

INVENTORS
ISAAC ALLAN BROWNLIE
GEORGE ANDREW WEMYSS
JOHN JOSEPH CLARKE
HUBERT CHARLES OLDLAND

By
Cushman, Darby & Cushman
ATTORNEYS

United States Patent Office 3,323,897
Patented June 6, 1967

3,323,897
MANUFACTURE OF SOLID COMPOSITIONS
COMPRISING AMMONIUM PHOSPHATES
Isaac Allan Brownlie, George Andrew Wemyss, John Joseph Clarke, and Hubert Charles Oldland, all of Edinburgh, Scotland, assignors to Scottish Agricultural Industries Limited, Edinburgh, Scotland, a corporation of Great Britain
Filed Mar. 19, 1964, Ser. No. 353,203
Claims priority, application Great Britain, Mar. 22, 1963, 11,466/63
5 Claims. (Cl. 71—37)

The present invention relates to a process for the production of a solid composition comprising ammonium phosphate of desired N:P ratio.

Monoammonium phosphate, $NH_4H_2PO_4$, and diammonium phosphate, $(NH_4)_2HPO_4$ and mixtures of these salts, are desirable ingredients of fertilisers because they supply both nitrogen and phosphorus, two elements which are essential to plant growth. An ammonium phosphate is characterized by the atomic ratio of nitrogen to phosphorus which it contains, commonly termed the N:P atomic ratio; thus monoammonium phosphate has an N:P atomic ratio of 1.0 and an equimolar mixture of monoammonium phosphate and diammonium phosphate has an N:P atomic ratio of 1.5. The N:P atomic ratio of a composition containing nitrogen or phosphorus compunds in addition to ammonium phosphate is the N:P atomic ratio of only the ammonium phosphate component.

One of the alternative sources of phosphorus in fertilisers is single superphosphate which is microcrystalline in nature, i.e., it contains crystals in the main smaller than 0.1 mm. in size, and is thixotropic when moist. Thus granules can be simply formed by working solid moist single superphosphate alone or mixed with other ingredients in known granulating equipment. If, on the other hand, it is desired to use ammonium phosphates rather than single superphosphate as the source of phosphorus in granular fertilisers, then the granulation process usually involves the use of a liquid slurry of the ammonium phosphates. Solid ammonium phosphates are sometimes used in the manufacture of granular fertilisers but, with the exception of the process claimed in co-pending British specification No. 951,475, unless there is some single superphosphate present, granulation is difficult.

In co-pending British specification No. 951,476 there is claimed inter alia a process for the production of solid ammonium phosphate of N:P atomic ratio in the range 0.95 to 1.6 which when it has been produced from phosphoric acid made by the wet-process and has a moisture content between 3.5 and 15% $H_2O$ is similar to moist solid single superphosphate in its granulating properties and is well suited for use in the process claimed in co-pending British specification No. 951,475. A product of the aforesaid N:P atomic ratio range is desirable because below the lower limit the ammonium phosphate is very acid and corrosive and above N:P 1.6 excessive amounts of ammonia are liable to be evolved on granulation and drying. This solid ammonium phosphate is particulate, that is to say, it comprises agglomerates of small ammonium phosphate crystals, in the main between 0.1 and 0.5 mm., which agglomerates are substantially smaller than the granules of the desired product. We have now found another process for the manufacture of a particulate solid comprising ammonium phosphate well suited for use in the process claimed in co-pending British specification No. 951,475.

According to the present invention the process for the continuous production of a solid particulate product comprising ammonium phosphate of N:P atomic ratio of 0.95 to 1.5 and moisture content between 3.5% and 12.0% $H_2O$ on a wet basis comprises mechanically disturbing a bed of particles comprising ammonium phosphate contained in a stationary vessel by at least one rotating shaft adapted to remove temporarily solid particles from said bed into the free space in said vessel, adding phosphoric acid to the said removed solid particles, allowing the acidified particles to return to the bed, adding ammonia to said bed, controlling the rate of addition of the reactants so that the N:P atomic ratio and the moisture content of the resulting product are in the specified ranges and removing from the bed an amount of solid particulate product substantially equivalent to that produced by the addition of the reactants.

It is found that the ammonium phosphate in the resulting solid particulate product exists as crystals of less than 0.1 mm. in size and has a physical form which closely resembles that of single superphosphate.

The aforesaid vessel may be a pin-mixer comprising a trough fitted with a shaft on which pins or blades are mounted and which is rotatable at such a speed as to remove temporarily the solid particles from the bed into the free space of the trough.

The ratio of the total weights of N and $P_2O_5$ in any chemical form in the product is called the $N:P_2O_5$ weight ratio. This ratio may be varied if desired by the addition of other ammonium salts and/or urea or by the addition of other acids, such as sulphuric or nitric acid, in addition to the phosphoric acid.

In the process of the invention the ammonium phosphate in the resulting solid particulate product is also limited to the stipulated range of N:P atomic ratio because at an N:P atomic ratio less than 0.95 the ammonium phosphate is very acid, corrosive and hygroscopic owing to the presence of phosphoric acid and because excessive ammonia losses occur during production of ammonium phosphates of N:P atomic ratio greater than 1.5.

The process of the invention is also only suitable for the production of a solid particulate product of the specified moisture range because for a product having a moisture content less than 3.5% $H_2O$ (on a wet basis) ammoniation is not efficient and for a product above 12% $H_2O$ (on a wet basis) the bed ceases to be composed of discrete particles and takes on a dough-like consistency.

By the term "solid" is meant an intimate mixture of solid particles and saturated aqueous solution of soluble ingredients wherein the proportion of solution is less than that at which there is a substantial separation of liquid from the product under a pressure of 6 p.s.i.g. which approximates to usual storage conditions. The maximum levels of moisture content permissable vary with solid particle size, being lower with larger particles, and also with the chemical composition.

It is to be understood however that the moisture remaining after the completion of the process of this invention is never to be so high as to prevent the end-product being solid at ambient temperatures.

Preferably, phosphoric acid made by the "wet-process" is used, and the process allows the use, if necessary, of phosphoric acid of high concentration than can normally be ammoniated to N:P atomic ratios of 0.95 to 1.5 without a tendency to solidify at lower N:P atomic ratios and retard further reaction.

Preferably the ammonia added is either in the gaseous or anhydrous liquid form but ammonia solutions are also suitable so long as the water introduced thereby does not cause the product moisture content to exceed the limiting value because above this the product ceases to be a solid at ambient temperatures.

Preferably there is no application of supplementary heat to the process. Sufficient heat is generated by the reaction of ammonia and phosphoric acid, and, optionally, other acids, to remove sufficient water to give a solid product.

Figure 2:
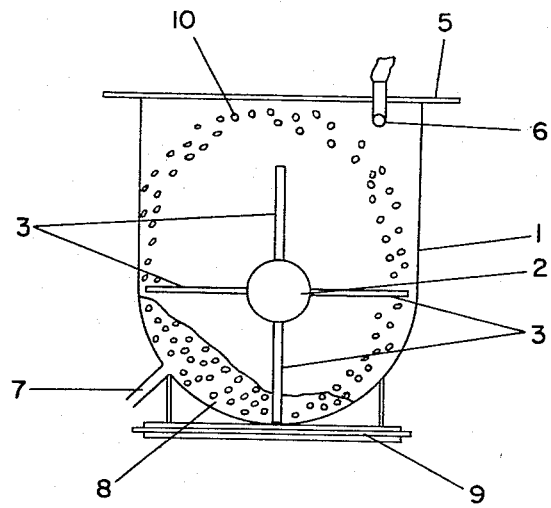

A suitable form of apparatus which can be used for carrying out the process of the invention is illustrated in FIGURES 1 and 2 of the accompanying diagrammatic drawings.

FIGURE 1 is an elevation in part section and FIGURE 2 is a cross section on the line I—I of FIGURE 1.

The apparatus comprises a U-section trough 1 (4' long, 1'7" wide, 1'10" deep), with closed ends, and in which a rotatable shaft 2, is mounted longitudinally. The shaft 2 (2" diameter) carries along its length four series of pins 3 (each pin 8" long), each series mounted at right angles to the next, and passes through bearing 4. The U-section trough 1, is covered by a wire mesh 5, to which is fitted an acid sparge pipe 6 (fitted with 8 evenly-spaced holes). A series of six ammonia injection pipes 7 (shown in FIGURE 2) are positioned along the under side of trough 1 and lead into bed 8 (shown in FIGURE 2). A sliding port 9 is fitted on the bottom at one end of the trough 1.

In operation the shaft 2, is rotated at, for example 112 r.p.m., in a clockwise direction, as viewed in FIGURE 2. This rotation causes particles 10, to be removed from the bed 8, which for example weighs about 100 lbs., into the free space within the trough 1, to follow an approximately circular path around the shaft 2, back into the bed 8. The wire mesh top 5, prevents the disturbed particles 10, from spilling out of the trough, but at the same time allows the removal of the moisture evaporated in the process. Phosphoric acid and other acids, if desired, are spread on to the disturbed particles 10, through sparge pipe 6, before the particles return to the bed 8, into which ammonia is injected through pipes 7 to ammoniate the particles to the desired degree. By suitable adjustment of port 9, equivalent solid material to that added as phosphoric acid and ammonia is removed, for example, at about 60 lb./hr.

By way of example, the following table summarises the details of the reactants and product in two typical runs.

|  | Run 1 | Run 2 |
|---|---|---|
| Acid introduced through pipe 6. | Wet-process phosphoric acid (46.6% $P_2O_5$). | Mixture of nitric acid (63% $HNO_3$) and wet-process phosphoric acid (45% $P_2O_5$). |
| Ammonia introduced through pipe 7. | Gaseous | Gaseous. |
| Product analysis (wet basis): |  |  |
| Percent N | 12.4 | 26.4. |
| Percent $P_2O_5$ | 49.5 | 18.3. |
| Percent $H_2O$ | 5.0 | 5.4. |
| N:P ratio | 1.01 | 1.30. |
| Product size | Fine dust to some oversize >3.35 mm. | Fine dust to some oversize >3.35 mm. |
| Crystal size | <0.1 mm | <0.1 mm. |

What we claim is:

1. A process for the continuous production of a solid particulate product comprising ammonium phosphate of N:P atomic ratio of 0.95 to 1.5 and moisture content between 3.5% and 12% $H_2O$ on a wet basis which comprises mechanically disturbing a bed of particles comprising ammonium phosphate contained in a stationary vessel by at least one rotating shaft, temporarily removing solid particles from said bed into the free space in said vessel, adding phosphoric acid to the said removed solid particles, allowing the acidified particles to return to the bed, adding ammonia to said bed, controlling the rate of addition of the reactants so that the N:P atomic ratio and the moisture content of the resulting product are in the specified ranges, and removing from the bed an amount of solid particulate product substantially equivalent to that produced by the addition of the reactants.

2. A process as claimed in claim 1 wherein the stationary vessel is a pin-mixer comprising a trough fitted with a rotatable shaft on which are mounted pins and which is rotatable at such a speed as to remove temporarily the solid particles from the bed into the free space of the trough.

3. A process as claimed in claim 1 wherein the stationary vessel is a pin-mixer comprising a trough fitted with a rotatable shaft on which are mounted blades and which is rotatable at such a speed as to remove temporarily the solid particles from the bed into the free space of the trough.

4. A process as claimed in claim 1 wherein the phosphoric acid has been made by a wet process.

5. A process as claimed in claim 1 wherein at least one acid selected from the group consisting of nitric acid and sulphuric acid is introduced with the phosphoric acid added to the said removed solid particles.

References Cited

UNITED STATES PATENTS 2,600,253   6/1952   Lutz _____ 71—43 X
3,192,034   6/1965   Baynham et al. _____ 71—41

S. LEON BASHORE, *Acting Primary Examiner.*

DONALL H. SYLVESTER, *Examiner.*

T. D. KILEY, *Assistant Examiner.*